United States Patent
Cheethirala

(10) Patent No.: US 8,660,248 B2
(45) Date of Patent: Feb. 25, 2014

(54) METHOD AND STRUCTURE FOR CONTROLLING INCOMING COMMUNICATION NOTIFICATION

(76) Inventor: Rajesh Cheethirala, Tracy, CA (US)

( * ) Notice: Subject to any disclaimer, the term of this patent is extended or adjusted under 35 U.S.C. 154(b) by 78 days.

(21) Appl. No.: 13/182,278

(22) Filed: Jul. 13, 2011

(65) Prior Publication Data

US 2013/0016819 A1   Jan. 17, 2013

(51) Int. Cl.
*H04M 1/56* (2006.01)
*H04M 15/06* (2006.01)
*H04M 3/42* (2006.01)

(52) U.S. Cl.
USPC .............. 379/142.07; 379/201.1; 379/373.01

(58) Field of Classification Search
USPC .............. 379/142.07, 201.1, 211.02, 212.01, 379/373.01
See application file for complete search history.

(56) References Cited

U.S. PATENT DOCUMENTS 6,408,187 B1 * 6/2002 Merriam .......... 455/458
6,633,632 B1 * 10/2003 Harlow et al. .......... 379/188
7,120,238 B1 * 10/2006 Bednarz et al. .......... 379/201.1
7,333,604 B2 * 2/2008 Zernovizky et al. ..... 379/392.01
2007/0217584 A1 * 9/2007 Bi et al. .......... 379/142.15

OTHER PUBLICATIONS http://www.visual-recognition.nl/, obtained May 10, 2012, 1 page.
http://www.voiceit-tech.com/, obtained May 10, 2012, 3 pages.
http://www.voiceit-tech.com/index.php?id=37, obtained May 10, 2012, 3 pages.

* cited by examiner

*Primary Examiner* — Quoc D Tran
(74) *Attorney, Agent, or Firm* — Scheinberg & Associates, PC; Michael O. Scheinberg

(57) ABSTRACT

A method and structure for avoiding undesirable interruptions by incoming calls during face-to-face conversations or oral presentations. A speaker recognition circuit is trained to recognize the user's voice, even in the presence of other voices and ambient noise. A number of speaker recognition algorithms may be employed within the scope of the invention. The phone is configured to constantly monitor the aural phone environment, while recording in a FIFO memory a short interval of digitized sound. When an incoming call is received, the Caller ID is checked against a pre-defined Priority List of numbers to be directed to the user's attention as in the prior art. If the Caller ID is not on the Priority List, speaker recognition verifies whether the user has been speaking within the past few seconds, and, if so, directs the incoming call to voice mail without interrupting the user. Other sensor input and criteria can also be used to determine how to route an incoming communication.

20 Claims, 8 Drawing Sheets

METHOD AND STRUCTURE FOR CONTROLLING INCOMING COMMUNICATION NOTIFICATION

TECHNICAL FIELD OF THE INVENTION

The present invention relates to the field of communication devices, and more particularly to the methods and structures for pre-empting notification to a user of an incoming communication when the user is otherwise engaged.

BACKGROUND OF THE INVENTION

In recent years, with the advent of more advanced wireless and land-line telephone systems, various call-waiting features have been added to phone services to enable telephone users to answer a second call which is received while a first call is still in progress. For example, with cell phones, it is common to provide a service where, if a first call is in progress, a second incoming call is brought to the phone user's attention by a series of "beeps" and a visual indication on the screen that a second call is waiting, including a display of the Caller ID number for the second call. This displayed Caller ID number then aids the phone user in determining whether to switch to the second call, or allow it to go to voicemail. These features function entirely within the realm of the telephone itself, in other words, other possible conversations which might be in progress on the part of the phone user which do not involve the phone itself are completely disregarded by the phone since the phone has no way of "knowing" anything about them. For example, a phone user might already be engaged in an important face-to-face conversation, or possibly an oral presentation to an audience, and not want to be interrupted by any incoming phone calls except those from a pre-determined list of "Priority Numbers." Therefore it would be advantageous for a telephone to have the capability for recognizing when the phone owner (the "user") is already engaged in a face-to-face conversation or an oral presentation and then immediately shunt an incoming call to voicemail without any audible or vibratory interruption of the user's activities. A further advantageous feature of an advanced telephone service would be an ability to modify this call-shunting activity for a certain set of important phone numbers, such as close family members or business colleagues. In the case of an incoming call from this select group of numbers, a "Priority List" could be pre-defined by the phone user so that when the Caller ID for an incoming call matches a number on the "Priority List" the phone owner would be notified as in the prior art, i.e., the incoming call would not be immediately shunted to voicemail, but instead would remain in a waiting state while the phone owner determines (based on the displayed incoming Caller ID number) whether or not to answer the call.

SUMMARY OF THE INVENTION

An object of the invention is to provide a structure and method for an improved communications device.

A communications device employs a sensor that monitors the environment of the device and handles incoming communications accordingly. For example, a device may include a speaker recognition circuit for determining if a user or other individuals are already speaking and then route a communication to a message service to avoid interrupting the user. In another embodiment, a camera may form an image that is processed to determine the environment of the device. For example, an image processor may determine from an image whether or not a user is away from the device. to indicate the availability of the user and/or to route an incoming communication accordingly.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

Figure 1:
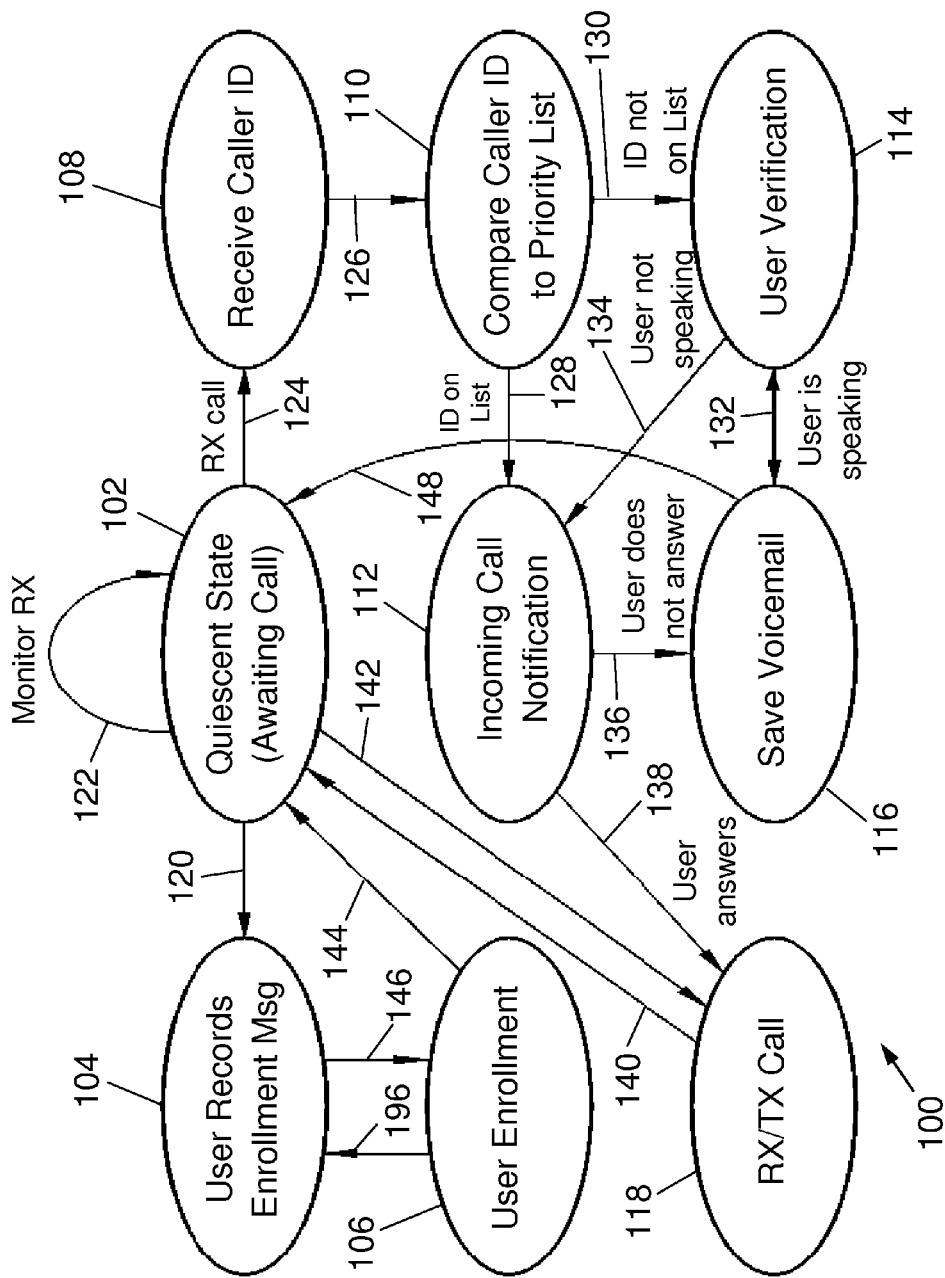
FIG. 1 is a non-deterministic state-diagram illustrating the nine operating modes of the telephone.

Embodiments of the invention can provide one or more advantages over typical prior art communications devices, such as mobile (cell), land-line telephones or computers that provide on-line audio, video, or text communication.

In one embodiment, a communications device includes a speaker recognition circuit monitoring of the aural environment of a user. When an incoming call is received, the Caller ID number is first compared with a Priority List of phone numbers which the telephone user does not wish to be shunted to voice mail, even in the event that the phone user is already engaged in non-phone speech such as face-to-face conversations or giving an oral presentation. If the incoming Caller ID matches a pre-defined number in the Priority List, then the call will be treated in the normal the prior art fashion, that is, an indication of the call will be provided to the user. If the incoming Caller ID is not on the Priority List, then a telephone according to a preferred embodiment of the present invention will determine if the user is already speaking. If the speaker recognition circuit does not detect speech from the user or one or more other designated or undesignated parties within a predetermined period of time preceding receipt of the incoming call, for example five seconds, then the call will be treated in the normal the prior art fashion. If the speaker recognition circuit does detect speech within a predetermined period of time preceding receipt of the incoming call, the incoming call will be shunted to voice mail, thereby not interrupting the non-phone speech of the user. This is similar to the situation in the prior art when an incoming call is received during a phone-based conversation by the user.

Some embodiments of the invention provide a speaker recognition circuit for determining if the user was already speaking during a brief (e.g., five seconds) period prior to receipt of an incoming phone call. Embodiments of the invention also provide a Priority List for incoming calls to determine if the user should be notified of the incoming call (for calls originating from numbers on the Priority List) or should be possibly shunted to voicemail immediately (for calls originating from numbers not on the Priority List). Some embodiments of the present invention provide a method for sorting incoming calls into one of three categories: 1) calls from numbers on the Priority List (treated as in the prior art), 2) calls from numbers not on the Priority List but occurring when the user is not speaking (treated as in the prior art), and 3) calls from numbers not on the Priority List but occurring when the user is speaking and treated according to the present invention. The communication device determines how to handle the communications based on the sensor input. The invention is not limited to any particular sensor input or any particular criteria or analysis applied by the device to the sensor input. Besides the presence or absence of the user's speech to determine the routing of the communication, the device could also use presence of speech of another designated person, such as the user's supervisor or spouse, or the presence of any speech at all.

A preferred method or apparatus of the present invention has many novel aspects, and because the invention can be embodied in different methods or apparatuses for different purposes, not every aspect need be present in every embodiment. Moreover, many of the aspects of the described embodiments may be separately patentable. Not all embodiments will provide all the benefits described herein.

State Diagram for Nine Operating Modes

FIG. 1 is a non-deterministic state-diagram 100 illustrating the nine operating states of a telephone according to a preferred embodiment of the present invention, illustrated by ovals 102, 104, 106, 108, 110, 112, 114, 116, and 118. The arrows shown illustrate transitions between states. The states and arrows in FIG. 1 and in the description below represent actual operation of a telephone according to the present invention. In the Quiescent state 102, the phone continually cycles 122, awaiting one of two events: receipt of an incoming call, or initiation of an out-going call by the user. When an outgoing call is initiated by the user, state-transition arrow 142 leads to the RX/TX state 118 (receive or transmit), where the phone remains until one of two events occurs: the user terminates the call, or the incoming caller terminates the call. In either case, at the end of the call, state-transition arrow 140 leads back to the Quiescent state 102.

When an incoming call is received, state-transition arrow 124 leads to Receive Caller ID state 108 where the 10-digit caller ID number is acquired (although Caller ID numbers having different numbers of digits as is common outside North America could also be used). Details of the caller ID encoding methods are described below. In addition to typical Caller ID telephone numbers, embodiments of the present invention could also be used with computer-based instant message ids or with voice-over-internet ids such as a Skype id. Once the complete caller ID has been received in state 108, state-transition arrow 126 leads to Compare Caller ID to Priority List state 110. In state 110, the incoming Caller ID number acquired in state 108 is compared with a list of pre-defined priority phone numbers (see section below on the definition procedures for these numbers). These numbers correspond to incoming callers whose calls should not be shunted to voicemail if the user happens to be speaking at the time the incoming call is received. If the incoming Caller ID number is on the priority list, state-transition arrow 128 leads to Incoming Call Notification state 112, and the user is alerted to the incoming call by a ring-tone, vibration, or a combination of the two. If the incoming Caller ID number is not on the priority list, state-transition arrow 130 leads to the User Verification state 114 where it is determined whether certain ambient noise conditions are satisfied, for example whether the user of the telephone is currently speaking.

If state 114 determines that the user is currently speaking, the telephone call can be re-routed to another destination, as shown by state-transition arrow 132 leading to Save Voicemail state 116. As used herein, the phrase re-routing the call to another destination" can include any transfer or response to the incoming call other than ringing the phone receiving the call, including for example transferring the call to voice mail or other message storage, transferring the call to a different telephone number, or playing a recorded message to the caller. The state-transition arrow 132 is shown going in both directions because after the message is rerouted, the user environment continues to be monitored. When predetermined conditions, such a the user or another person speaking, that would cause deferral of call notification no longer exist and are absent for a period of time, such as about fifteen seconds, the user is notified that a call was missed. The user could be notified by a voice mail icon appearing on the device, by an audible signal, or by other means or combination of means. That is, when the user is no longer speaking, and has not been speaking for the period of time, he is notified of the missed call.

If state 114 determines that the user is not currently speaking, state-transition arrow 134 is followed to the Incoming Call Notification state 112. If the user does not answer the phone after a pre-determined number of call indicators (for example, rings or vibrations) state-transition arrow 136 is followed from the Incoming Call Notification state 112 to the Save Voicemail state 116. As used herein, the term "ring" may be used to indicate any type of call receipt indicator, including audible ring or ring tones, music, vibration, or visual indicators such as light or illuminated telephone screen, possibly displaying the Caller ID information or stored caller identity.

Once the voice message from the incoming caller has been recorded in state 116, state-transition arrow 148 leads back to the Quiescent State 102, where the phone remains until receipt of an incoming call or initiation of an outgoing call by the user. If the user does answer the phone, state-transition arrow 138 is followed to the RX/TX Call state 118, where the phone remains until one of two events occurs: the user terminates the call, or the incoming caller terminates the call. In either case, at the end of the call, state-transition arrow 140 leads back to the Quiescent mode 102.

Figure 2:
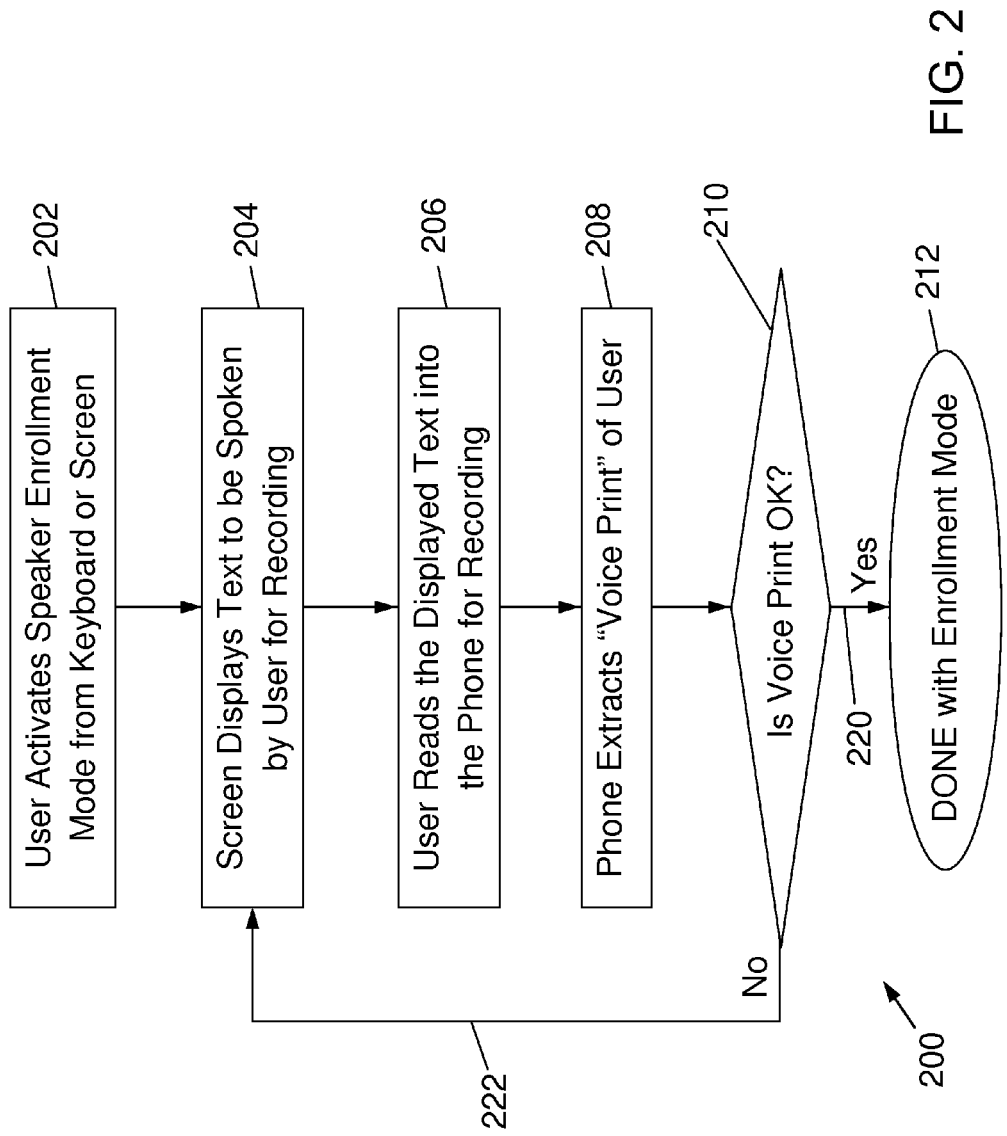
FIG. 2 is a flow chart for the speaker enrollment mode.

From the Quiescent State 102, the user may transition (following arrow 120) to the Speaker Enrollment routine comprising states 104 and 106, and state-transition arrows 146 and 196 (see also the flowchart in FIG. 2). First, state 104 is entered where a pre-defined script is presented to the phone user for recording. The user then reads this script into the phone to train the speaker recognition circuit to recognize the user's voice print, even in an environment with substantial ambient noise and other voices. The script comprises a range of speech components to enable the speaker recognition routine to recognize the user's voice with a high success probability, independent of the speech content. Following recording of the script in state 104, state-transition arrow 146 leads to User Enrollment state 106, where the recording of the script is analyzed and the analysis data is stored for use in User Verification state 114. If the recording is satisfactory for speaker recognition (the term "speaker" is used herein to indicate the phone user), state-transition arrow 144 leads back to the Quiescent state 102. If the recording is unsatisfactory for speaker recognition, state-transition arrow 196 leads back to state 104, where the user re-records the script.

In the event that a call is re-routed to another destination, such as a voice mailbox, upon an indication that the phone user is engaged in face-to-face communication, the telephone will preferably provide a notification of the received call and/or message at some point in the future. The notification could occur at some predefined time, which could be set by the user, or the notification could be provided by a non-intrusive method such as sending an email. In some preferred embodiments, the telephone could provide a ring or other notification only after determining that the user is no longer engaged in face-to-face communications using the methods described herein to check, for example, at predefined time intervals (for example, every 15 minutes until the notification can be provided).

Caller ID Encoding Methods

Figure 3:
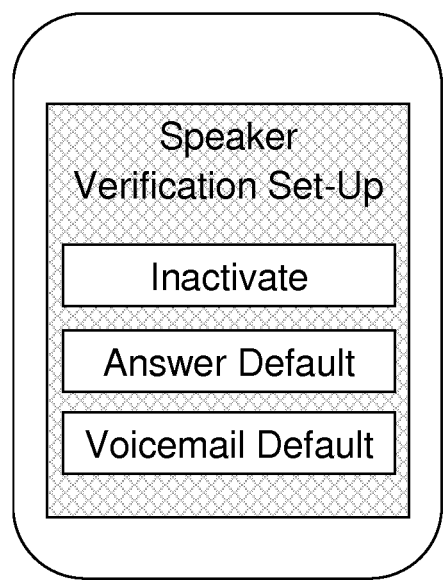
FIG. 3 is a screen shot for a telephone according to a preferred embodiment of the present invention during speaker verification set-up.

"Caller ID" (CID) is the designation in the United States for a telephone service which is available for both digital and analog phone systems, as well as the majority of Voice over Internet Protocol (VoIP) applications, in which the caller's 10-digit phone number is transmitted during the ringing signal. In some cases, the caller's name is also transmitted; however, this is not of importance for the operation of preferred embodiment of the present invention. In other countries, Caller ID may be called "Calling Line Identification" (CLID) or Calling Number Identification (CNID). Unfortunately, details of the phone number transmission scheme are often incompatible between countries. Details of the decryption of the caller ID number for specific countries are known and are not described herein. The decrypted Caller ID number is compared with the Priority List (the pre-defined numbers that are not to be shunted to voicemail) in the event that the speaker recognition routine determines that the phone user is already speaking. FIG. 3 is a screen shot illustrating two possible default modes for incoming phone call notification to the user.

Definition of Numbers in the Priority List

A telephone according to a preferred embodiment of the present invention may have an input screen for entering those phone numbers that are not to be shunted to voice mail in cases when the speaker recognition routine determines that the phone user is speaking or giving an oral presentation. Such data entry screens are well known in the prior art. In some embodiments, certain emergency calls can be automatically set to ring the user's telephone even if not on the Priority List. Certain numbers specified by the service provider could also be set to ring the user's telephone even if not on the Priority List. In some embodiments, the telephone could be set to re-route even numbers on the Priority List during user-defined times (for example, from 6-7 pm for family dinnertime).

Speaker Enrollment Mode Flow Chart

Figure 5:
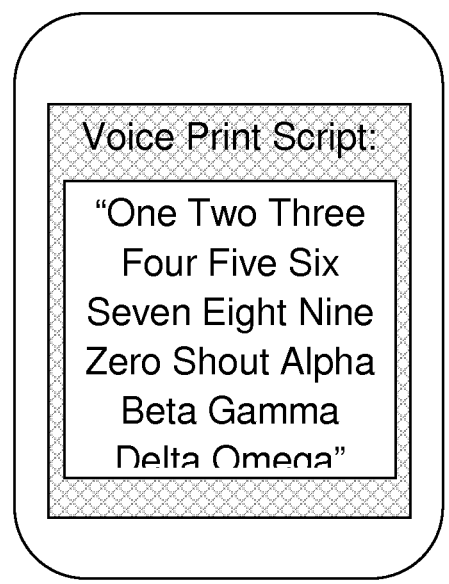
FIG. 5 is a screen shot for a telephone according to a preferred embodiment of the present invention displaying the voice print script.

FIG. 2 is a flow chart 200 for the speaker enrollment mode in states 104 and 106 of FIG. 1. Block 202 is entered after the user enters the Speaker Verification Set-Up mode shown in the screen shot of FIG. 3. Next, block 204 is entered, corresponding to the screen shot in FIG. 5. A pre-determined "training" script is presented to the user on the screen of the phone as illustrated in FIG. 5. The user then reads this script into the microphone of the telephone in block 206. Block 208 then extracts a voice print of the user. In decision block 210, comparator 870 (see FIG. 8) determines if the quality of the voice print is adequate to uniquely characterize the phone user. If the voice print quality is acceptable, arrow 220 is followed to completion block 212, corresponding to state-transition arrow 144 back to the Quiescent state 102 in FIG. 1. If the voice print quality is unacceptable, arrow 222 (corresponding to state-transition arrow 196 in FIG. 1) leads back to block 204 to repeat the script recording process until an acceptable voice print has been extracted in block 208. Methods of determining when a voice print is acceptable are well known in the art and are used, for example, in security software.

Screen Shots for Telephone Operating Modes

FIG. 3 is an example of a possible screen shot 300 for a telephone according to a preferred embodiment of the present invention during speaker verification set-up. While the example of FIG. 3 is a cell phone, preferred embodiments of the present invention could be embodied in any type of device capable of telephonic communication, including cell phones, land-line phones, or computers such as an iPad using VoIP. In the example of FIG. 2, three buttons are presented to the user, labeled "Inactivate," "Answer Default," and "Voicemail Default." If the user presses the "Inactivate" button, then Speaker Verification is inactivated and the user will be notified of all incoming calls as for prior art mobile telephones. Pressing either of the two buttons "Answer Default" and "Voicemail Default" initiates the Speaker Verification method according to a preferred embodiment of the present invention, but with differing default actions in the event that the comparator 870 (see FIG. 8) is unable to determine if the user is currently speaking. If the user presses the "Answer Default" button, then Speaker Verification will notify the user of an incoming call if there is uncertainty about whether the user is speaking. Conversely, if the user presses the "Voicemail Default" button, then Speaker Verification will transfer the incoming call to voicemail if there is uncertainty about whether the user is speaking.

Figure 4:
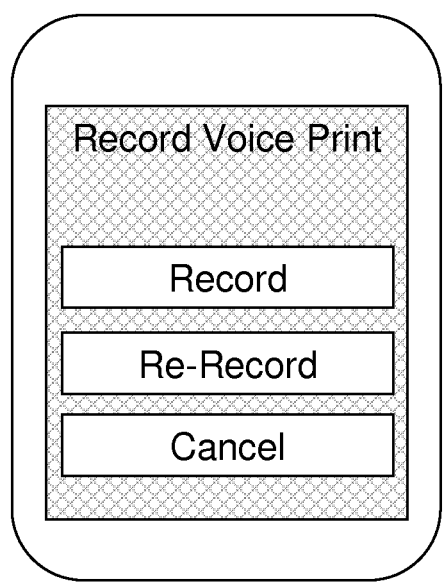
FIG. 4 is a screen shot for a telephone according to a preferred embodiment of the present invention during preparations for recording a voice print.

FIG. 4 is an example of a possible screen shot 400 for a telephone according to a preferred embodiment of the present invention during preparations for recording a voice print, as in state 104 of FIG. 1. Pressing the "Cancel" button inactivates Speaker Verification and returns the phone to the Quiescent state 102 (see FIG. 1). Pressing the "Record" button initiates the recording of the voice print script which is illustrated in the screen shot of FIG. 5. The "Re-Record" button is used if the user is unsatisfied with the quality of the voice print just recorded.

FIG. 5 is an example of a possible screen shot 500 for a telephone according to a preferred embodiment of the present invention displaying a voice print script. The exemplary script shown in FIG. 5 for illustrative purposes only. The required characteristics for the voice print script are determined by the specific speaker verification method used, as is discussed below.

Figure 6:
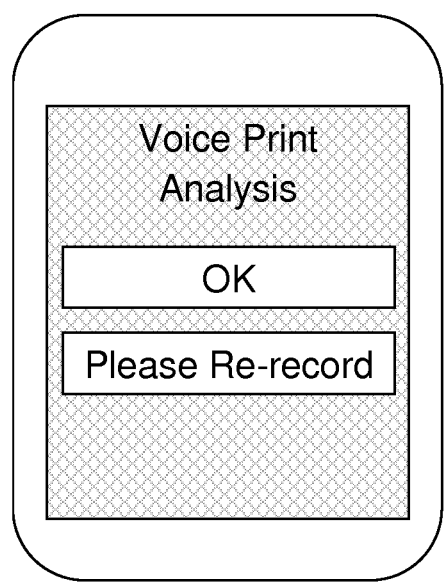
FIG. 6 is a screen shot for a telephone according to a preferred embodiment of the present invention displaying the results of the analysis of the voice print recorded during FIG. 5.

FIG. 6 is an example of a possible screen shot 600 for a telephone according to a preferred embodiment of the present invention displaying the results of the analysis of the voice print recorded during FIG. 5 (state 106 in FIG. 1). Two indicators are shown: "OK" and "Please Re-record". If the voice print is satisfactory for use in subsequent speaker verifications (in state 114 of FIG. 1), then "OK" will be displayed. If the voice print is unsatisfactory, then "Please Re-record" will be displayed. Once the user presses the "Please Re-record" button, the phone will return to FIG. 5 to enable a re-recording of the voice print script.

Figure 7:
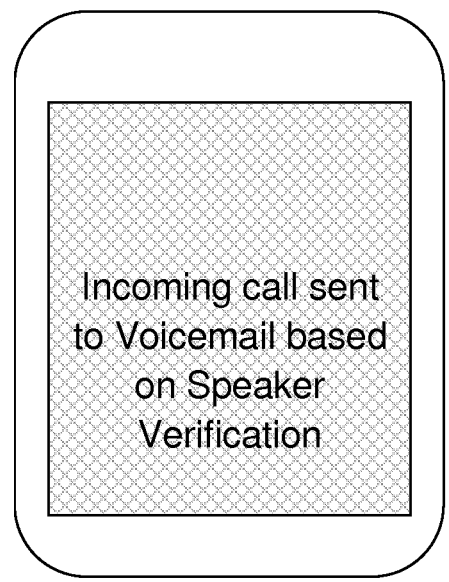
FIG. 7 is a screen shot for a telephone according to a preferred embodiment of the present invention after an incoming call has been automatically shunted to voice mail based on speaker verification.

FIG. 7 is an example of a possible screen shot 700 for a cell phone according to a preferred embodiment of the present invention after an incoming call has been automatically shunted to voice mail based on speaker verification—this screen shot would be displayed during both state-transition 132 and Save Voicemail state 116 in FIG. 1.

Schematic Block Diagram of an Exemplary Telephone

Figure 8:
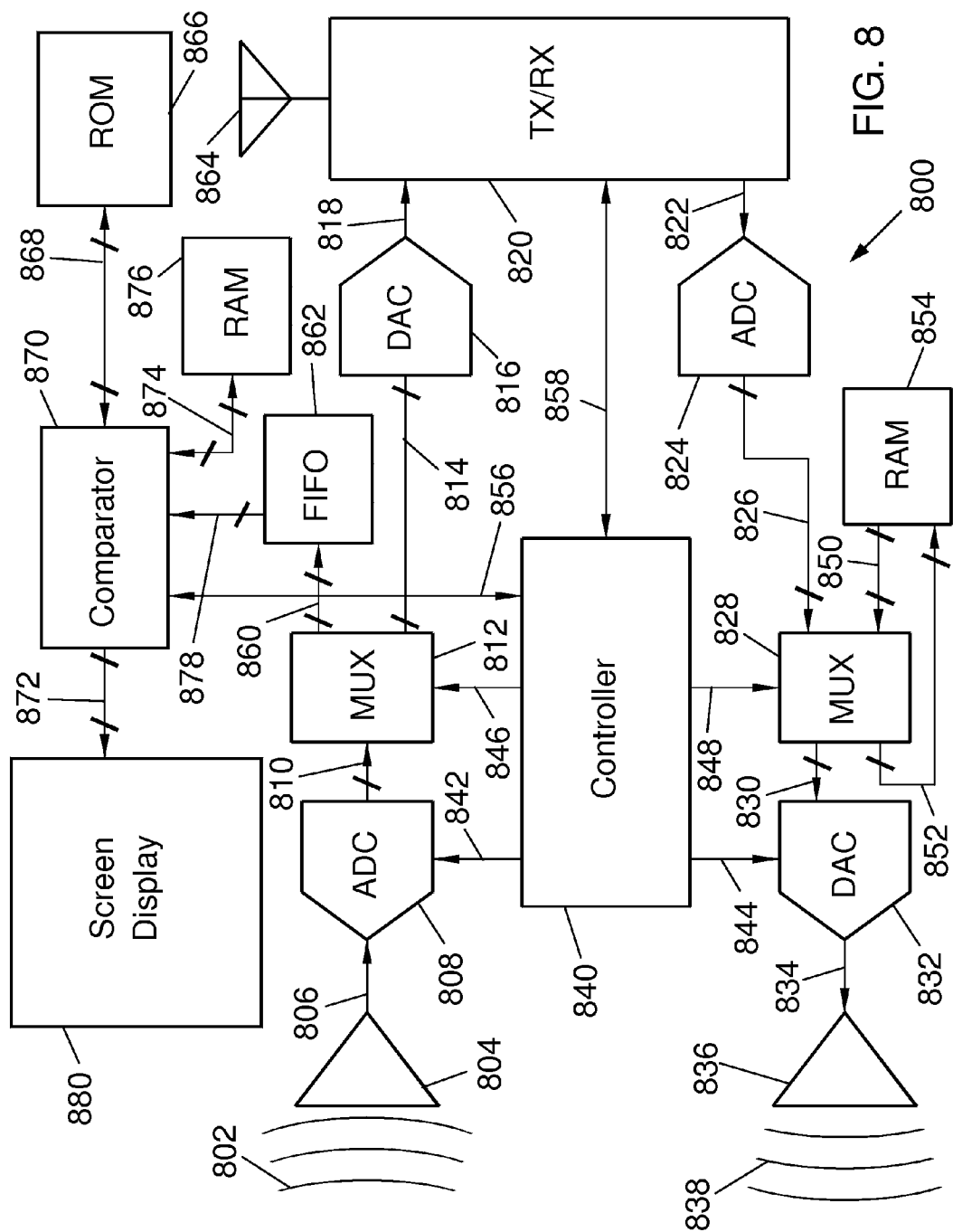
FIG. 8 is a schematic block diagram of a telephone according to a preferred embodiment of the present invention.

FIG. 8 is an exemplary schematic block diagram 800 of a telephone that is a communications device according to a preferred embodiment of the present invention, utilizing analog RF signal transmission. Other devices and other circuits are possible within the scope of the structure and method of the present invention. A sensor, in this embodiment a microphone, detects the environment around the device. Incoming speech and ambient sounds 802 are collected by a microphone and pre-amplifier circuit 804 connected through analog link 806 to an analog-to-digital converter (ADC) 808. In FIG. 8, analog lines are represented as arrows without slashes, while multi-bit digital cables are represented by arrows with slashes. Typically, the number of binary bits conveyed by the digital cables may range from 8 to 16 or more, although other numbers could also be used. The digitized sound waveform 810 from ADC 808 goes to a multiplexer (MUX) 812. Based on a control signal 846 from a processor, such as a Controller 840, MUX 812 will direct the incoming data on cable 810 to either the output digital-to-analog converter (DAC) 816 through cable 814, or to the first-in-first-out (FIFO) memory 862 through cable 860. Data entering DAC 816 is converted to an analog sound waveform which is conducted to the transmitter/receiver (TX/RX) 820 through analog connection 818. Sound waveforms on connection 818 represent data being transmitted by TX/RX 820 through radio frequency (RF) antenna 864 as is familiar to those skilled in the art. For transmitter/receivers 820 sending binary sound data, DAC 816 would not be necessary. Details of TX/RX signals are familiar to those skilled in the art.

Received sound waveforms from TX/RX 820 are conducted through analog connection 822 to ADC 824, where the sound waveforms are converted to digital data which is transmitted through cable 826 to one input of MUX 828. Based on control signal 848 from Controller 840, MUX 828 will direct the incoming data on cable 826 to either DAC 832 (through cable 830) or to random-access memory (RAM) 854 (through cable 852). Sound waveform data stored in RAM 854 may be subsequently fed through cable 850 back to MUX 828, based on control signal 848. RAM 854 represents a voicemail memory within a phone according to a preferred embodiment of the present invention. Controller 858 interacts with the transmitter/receiver (TX/RX) 820 through control link 858. Sound data entering DAC 832 is then converted to an analog sound signal which is conveyed through connection 834 to an output amplifier and speaker 836 to produce sound waves 838.

FIFO 862 is used to store two types of speech data. First, FIFO 862 is used to temporarily store voice-print data recorded in state 104 of FIG. 1 (also block 206 in FIG. 2). Second, FIFO 862 is used to store a continually-updated portion (e.g., the previous five-seconds) of the ambient speech and noise collected by microphone and pre-amplifier 804 from the aural environment of a telephone according to a preferred embodiment of the present invention. For both modes, the digitized sound waveforms are transmitted to Comparator 870 through cable 878. Read-only memory (ROM) 866 stores the Speaker Recognition routines used by Comparator 870 for the following two functions: first, extracting the unique characteristics of the telephone user's speech patterns (thereby extracting a "voice print" for "speaker enrollment"), and second, comparing the ambient sound waveforms with this pre-determined voice print ("speaker verification"). During the determination of the user's voice print (see the User Enrollment state 106 in FIG. 1 and block 208 in FIG. 2), Comparator 870 executes routines stored in ROM 866 as conveyed to Comparator 870 through cable 868. The resulting parameters in the voice print of the user are then directed through cable 874 for storage in RAM 876. In User Verification state 114 of FIG. 1, Comparator 870 utilizes the stored voice print in RAM 876 to determine if the portion of sound waveform stored in FIFO 862 contains speech patterns characteristic of the voice of the telephone user. If the Comparator 870 determines that the user voice print matches some or all of the sounds stored in FIFO 862, then state-transition arrow 132 in FIG. 1 is followed to Save Voicemail state 116. If the Comparator 870 determines that the user voice print does not match any of the sounds stored in FIFO 862, then state-transition arrow 134 in FIG. 1 is followed to Incoming Call Notification state 112 in FIG. 1. Thus, the system determines from the sensed environment whether or not to alert a user of an incoming communication. In some embodiments, the system makes the determination based on whether the user is speaking; it some embodiments, the system makes the determination based on whether or not the user is present.

Speaker Recognition Methods

Many different methodologies are possible to enable telephones according to the invention to perform speaker recognition. The speaker recognition method chosen is embodied in the speech analysis routine stored in ROM 866 and executed by Comparator 870. The difference between "Speaker Recognition" and "Speech Recognition" is that in the former, we want to determine who is speaking but we do not care what the content of the speech is, while for the latter, we only care about the content of the speech, generally independent of who is speaking. For the telephones according to preferred embodiments of the present invention, we are only interested in speaker recognition where the "speaker" is the user of the telephone. There are two types of speaker recognition systems: text-dependent and text-independent. In text-dependent speaker recognition, the same script is used for both the initial step of generating the voice print, and also for the subsequent step of speaker verification—these methodologies may not be appropriate for use with the present invention. In text-independent speaker recognition, the stored voice print (in RAM 876) is compared with whatever sound waveform has been recorded in FIFO 862 during the preceding short time period (e.g., five seconds).

Speaker recognition generally comprises two sequential steps: a first step ("enrollment") during which the telephone is trained to recognize the voice of the user, and a second step ("verification") during which the phone is required to determine whether the telephone user was already engaged in speech (not through the telephone) prior to receipt of an incoming phone call. Enrollment involves the extraction of a "voice print" of the user's speech patterns, based on an analysis of a recorded "script" designed to contain a number of sound patterns (e.g., phonemes) chosen to be consistent with the particular speaker recognition methodology to be used in a telephone according to a preferred embodiment of the present invention.

Many methods and technologies are possible to process and store voice prints including frequency estimation, neural networks, hidden Markov models, pattern matching algorithms, decision trees, etc., and any known method could be applied to embodiments of the present invention. Since the aural environment of the telephone may contain a wide range of speakers (e.g., when a telephone is in a busy office environment) as well as other, non-speech, noises (e.g., when a cell phone is outdoors). Thus a degree of filtering for ambient noise may be desirable prior to processing the stored sound waveforms for speech patterns.

As used herein, "face-to-face" speech means any speech that is not being conducted through the telephone on which the embodiment of the invention is operating. For example, "face-to-face" speech may include a conversation with a single individual, speech to a group of individuals, or speech over an electronic device—including another telephone—other than the telephone on which the embodiment of the invention is operating. In some embodiments, times when the user is on a call from the same device can be treated as a face-to-face conversation. That is, rather than providing the typical "call waiting" signal to the user, no indication is provided of the incoming call while the user is on another call, unless the new caller is on the priority list. If the new caller is not on the priority list, no indication is provided to the user and the new call is automatically routed to voice mail or other communications storage. That is, monitoring the environment of the device can include monitoring the state of the device itself.

Further, although much of the descriptions herein are directed at determining whether the telephone user is speaking, other ambient sound conditions could be used to determine whether to re-route the incoming call. For example, the telephone could determine whether another person's voice is identified (such as a boss, teacher, or particular co-worker) or whether ambient sounds indicate that the telephone user is in a certain environment, such as a movie theater, to determine whether or not to alert a user of an incoming call. The invention is not limited to any particular type of sensor for sensing the environment. In some embodiments, a camera can be used together with image processing circuitry to determine the environment around a user or around a communications device. For example, the system can monitor images from a camera on a computer to determine whether or not a user is sitting in front of the computer. The system can either look for the presence of any person in front of the computer using a general outline of a human, or the system can monitor for the presence of a specific person using facial recognition software. Recognition of the presence or absence of the user can be used in multiple ways. For example, if a call arrives over the computer, for example, from Skype other audio, video, or text chat, the call can be routed to store a message or to indicate to the caller that the user is not available. Also, the presence or the absence of the user in the image can be determined by image recognition software and used to determine a user status to display to others who might want to communicate with the user. For example, if a user is not present at a communications device, the system can cause the users status to become "away" so that other users will not attempt to contact the other users.

Another aspect of the invention is a "Smart Mute" feature in which the sensor detects when the user is speaking. When the user is not speaking, the device is automatically muted to prevent transmission of background noise or the voices of other speakers. Unlike prior art systems that would only mute when silence is detected, embodiments of the invention would specifically recognize the voice of the device user and mute, that is, cease transmitting, when the users voice is not detected, regardless of other voices or background sounds. When the use begins speaking again, the device "unmutes" and resumes transmitting. A method of operating a communications device comprises detecting sound around the communications device; analyzing the sound to determine whether or not a specific user is speaking; if the user is not speaking, muting the device; and when the user resumes speaking, unmuting the device. The communications device includes a sensor for detecting sound, a processor to analyze the sound and to mute the device when the user is not speaking.

Although the description of the present invention above is mainly directed at methods, it should be recognized that an apparatus performing the operation of such a method would further be within the scope of the present invention. Further, it should be recognized that embodiments of the present invention can be implemented via computer hardware, a combination of both hardware and software, or by instructions stored in a non-transitory processor-readable memory. The methods can be implemented in computer programs using standard programming techniques—including a non-transitory computer-readable storage medium configured with a computer program, where the storage medium so configured causes a computer to operate in a specific and predefined manner—according to the methods and figures described in this Specification. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits programmed for that purpose. The analysis of the sensor data can be performed on the device, or the sensor data can be transmitted to a different location for processing and for handling the incoming communication. When the analysis is performed elsewhere, the communication device receives the sensor data, transmits the sensor data to a different location for analysis and determination of how to route the communication, and then receives the communication if the analysis determined that the call should be forwarded to the communication device.

Further, methodologies may be implemented in any type of computing platform, including but not limited to, telephones, personal computers, mini-computers, main-frames, workstations, networked or distributed computing environments, computer platforms separate, integral to, or in communication with charged particle tools or other imaging devices, and the like. Aspects of the present invention may be implemented in machine readable code stored on a storage medium or device, whether removable or integral to the computing platform, such as a hard disc, optical read and/or write storage mediums, RAM, ROM, and the like, so that it is readable by a programmable computer, for configuring and operating the computer when the storage media or device is read by the computer to perform the procedures described herein. Moreover, machine-readable code, or portions thereof, may be transmitted over a wired or wireless network. The invention described herein includes these and other various types of computer-readable storage media when such media contain instructions or programs for implementing the steps described above in conjunction with a microprocessor or other data processor. The invention also includes the device itself when programmed according to the methods and techniques described herein.

Computer programs can be applied to input data to perform the functions described herein and thereby transform the input data to generate output data. The output information is applied to one or more output devices, such as a message storage system or a telephone. In preferred embodiments of the present invention, the transformed data represents physical and tangible objects, including producing a particular visual depiction of the physical and tangible objects on a display.

Further, throughout the present specification, discussions utilizing terms such as "calculating," "determining," "measuring," "generating," "detecting," "forming," or the like, also refer to the action and processes of a computer system, or similar electronic processing device, that manipulates and transforms data represented as physical quantities within the computer system into other data similarly represented as physical quantities within the computer system or other information storage, transmission or display devices.

The invention has broad applicability and can provide many benefits as described and shown in the examples above. The embodiments will vary greatly depending upon the specific application, and not every embodiment will provide all of the benefits and meet all of the objectives that are achievable by the invention.

Whenever the terms "automatic," "automated," or similar terms are used herein, those terms will be understood to include manual initiation of the automatic or automated process or step. In the following discussion and in the claims, the terms "including" and "comprising" are used in an open-ended fashion, and thus should be interpreted to mean "including, but not limited to . . . ."

To the extent that any term is not specially defined in this specification, the intent is that the term is to be given its plain and ordinary meaning. The accompanying drawings are intended to aid in understanding the present invention and, unless otherwise indicated, are not drawn to scale.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. A method of operating a communications device, comprising:
receiving an indication of an incoming communication;
sensing the aural environment outside the device receiving the incoming communication;
analyzing the sensed aural environment outside the device to recognize the voice of a specific person that the device was previously trained to recognize; and
if the voice of the specific person is recognized in the sensed aural environment outside the device, re-routing the incoming communication and if the voice of the specific person is not recognized in the sensed aural environment outside the device, announcing the incoming communication.

2. The method of claim 1 further comprising providing an indication of the re-routed incoming communication to the user when the voice of the specific person is no longer present.

3. The method of claim 1 in which, re-routing the incoming communication includes routing the communication to a message storage device if the communications device determines that the recipient is unavailable.

4. A communication device, comprising:
a connection for receiving an incoming communication;
a sensor for sensing the aural environment outside the device; and
a processor programmed to:
recognize the voice of one or more specific persons from the sensor output, the device having been trained to recognize the one or more specific persons; and
rerouting the incoming communication upon recognition of the voice of one or more specific persons.

5. The communication device of claim 4 in which the sensor comprises a microphone.

6. The method of claim 1 in which analyzing the sensed aural environment outside the device to recognize the voice of a specific person that the device was previously trained to recognize comprises using a speaker recognition system to identify the voice of a particular speaker in the detected sound.

7. The method of claim 6 in which analyzing the sensed aural environment outside the device to recognize the voice of a specific person that the device was previously trained to recognize comprises using a text-dependent speaker recognition system.

8. The method of claim 6 in which analyzing the sensed aural environment outside the device to recognize the voice of a specific person that the device was previously trained to recognize comprises using a text-independent speaker recognition system.

9. The method of claim 1 further comprising training the system to recognize the voice of the recipient or other pre-specified individual.

10. The method of claim 9 in which training the system to recognize the voice of the recipient or other pre-specified individual comprises obtaining a sample of the voice of the recipient or other pre-specified individual for later comparison with detected sounds.

11. The method of claim 1 in which analyzing the sensed aural environment outside the device to recognize the voice of a specific person that the device was previously trained to recognize includes analyzing the sound to specifically match the sound to the voice of the intended recipient.

12. The method of claim 1 further comprising determining whether the caller is listed on a priority list, and if so announcing the call instead of re-routing the call.

13. The communications device of claim 11 in which the processor is programmed to recognize the voice of one or more specific persons from the sensor output using a text-dependent or text-independent algorithm.

14. The communications device of claim 11 in which the processor programmed to decide whether or not to reroute the incoming communication is programmed to compare the caller with a priority list and not to re-route the call if the caller is on the list.

15. A method of operating a telephone system, comprising:
receiving an indication of an incoming communication;
comparing an identification associated with the incoming call to identities maintained in predetermined list; and if the identification associated with the incoming call is not included on the priority list,
sensing the aural environment outside the device receiving the incoming communication; and
analysing the sensed aural environment outside the device to recognize the voice of a specific speaker that the system was previously trained to recognise and if the specific speaker is recognized, re-routing the incoming communication.

16. The method of claim 15 in which if the identification associated with the incoming call is not included on the priority list, omitting announcing the incoming communication to interrupt the recipient.

17. The method of claim 15 in which analysing the sensed aural environment outside the device to recognize the voice of a specific speaker that the system was previously trained to recognize includes analyzing sound to recognize whether or not the intended communication recipient is speaking.

18. The method of claim 17 in which analysing the sensed aural environment outside the device to recognize the voice of a specific speaker that the system was previously trained to recognize comprises comparing sounds of the sensed environment to stored speaker identification information specific to the intended communication recipient or other specified individuals.

19. The method of claim 17 further comprising training the communication device to recognize specific speakers by obtaining speech samples from those speakers.

20. The method of claim 17 in which analyzing sound to recognize whether or not the intended communication recipient or other specified individuals are speaking comprises using a text-dependent speaker recognition algorithm or a text-independent speaker recognition algorithm.

* * * * *